CHRISTIAN & REINHART.
Velocipede.

No. 87,245.    Patented Feb. 23, 1869.

Witnesses:    Inventors:

United States Patent Office.

ANDREW CHRISTIAN AND JOHN REINHART, OF NEW YORK, N. Y., ASSIGNORS TO A. CHRISTIAN.

*Letters Patent No. 87,245, dated February 23, 1869.*

IMPROVEMENT IN VELOCIPEDES.

The Schedule referred to in these Letters Patent and making part of the same.

*To all whom it may concern:*

Be it known that we, ANDREW CHRISTIAN and JOHN REINHART, both of the city, county, and State of New York, have invented a new and useful Improvement in Velocipedes; and we do hereby declare that the following is a full, clear, and exact description of the same, reference being had to the accompanying drawing, forming part of this specification, in which—

This invention relates to the mechanism for propelling a velocipede, and to the combination therewith of certain mechanism for steering the same.

A designates the driving, and B, the steering-wheels of the velocipede.

C' is the seat, mounted on a reach, C, which is supported on the front axle D, and rear axle E.

Figure 1:
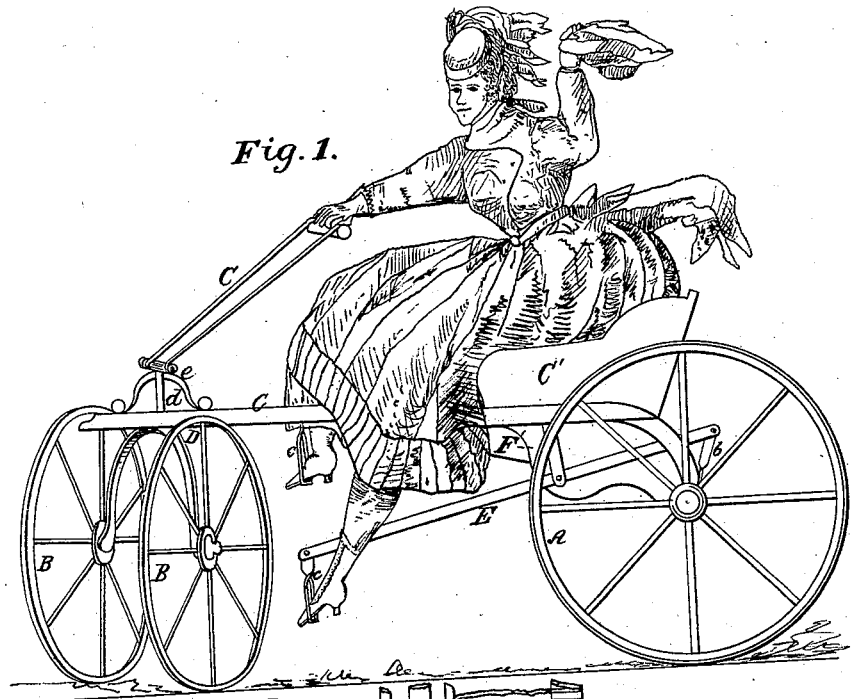
Figure 1 is a side elevation of a velocipede, showing our improvement applied thereto.
Figure 3:
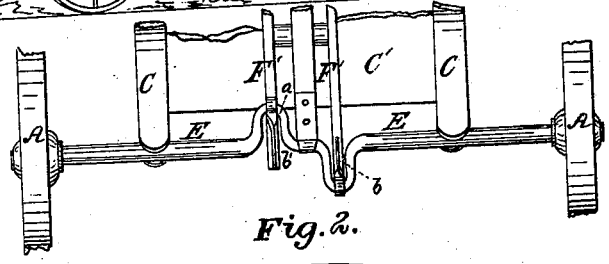
Figure 3 is an inverted plan view, showing the rear axle and operating-mechanism.

The actuating-mechanism consists of two levers, F F', which are pivoted, at some point about midway of their lengths, to stanchions, or to a block secured to the reach C, as shown in figs. 1 and 3, or in any other suitable manner.

Figure 2:
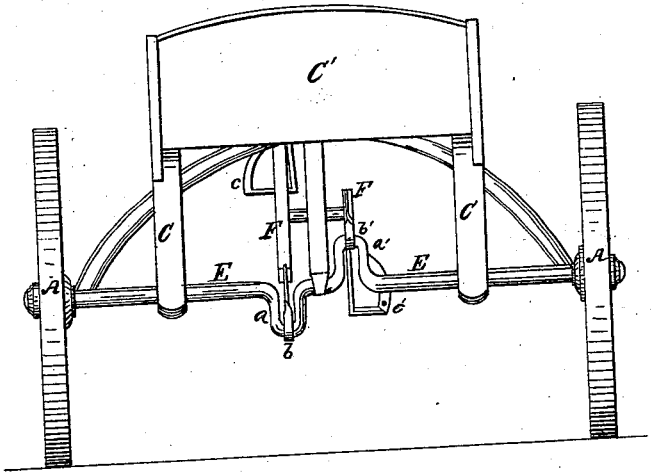
Figure 2 is a rear view of the same.

The axle E is provided with two cranks, $a\ a'$. (Refer to figs. 2 and 3.)

The levers F F' are connected to the cranks $a\ a'$ respectively, by connecting-rods $b\ b'$, and the forward ends of the levers are provided with stirrups $c\ c'$, into which the operator puts his feet, and, by an upward and downward-treading motion thereof, causes the axle to revolve, and by reason of the arrangement of the cranks, one of the levers will always be in position to operate the axle. The one overcomes the dead-point of the other, and the axle will have a continuous, uninterrupted revolution. And we wish here to call particular attention to the fact that the levers are operated by a downward motion of the foot in a vertical line, not by a forward thrust of the foot, and hence the propelling of the velocipede is effected in a more easy and graceful manner.

The front axle is curved upward, and upon it rests the forward end of the reach.

A pivot, $d$, passes from the axle up through the reach, where it is steadied by a support, $e$, or in any suitable manner, to which pivot a tiller, G, is connected.

By moving said tiller, which is held in the hand of the rider, the front wheel or wheels—and we will remark that there may be two or more, as desired—can be quickly turned, which, as is obvious, directs the course of the velocipede.

The steering-mechanism will be clearly understood by reference to fig. 1.

By the above-described improvements, we are enabled to produce a velocipede which can be easily operated by either male or female, quickly understood, and which requires no skill to enable one to guide the same, and propel it at a high rate of speed.

What we claim as our invention, and desire to secure by Letters Patent, is—

In a velocipede, the combination of the driving-mechanism, consisting of the wheels A, levers F F', stirrups $c\ c'$, and axle E, and its cranks $a\ a'$, with the steering-mechanism, consisting of the wheels B, axle D, pivot $d$, and tiller G, arranged and operating substantially as herein specified.

A. CHRISTIAN.
JOHN REINHART.

Witnesses:
M. M LIVINGSTON,
T. B. BEECHER.